United States Patent [19]

Brockhaus

[11] 4,174,133
[45] Nov. 13, 1979

[54] FASTENING DEVICE FOR A FIXABLE COVERING

[75] Inventor: Anton Brockhaus, Rheda-Wiedenbrück, Fed. Rep. of Germany

[73] Assignee: Westfalia-Werke Franz Knöbel & Sohne KG, Rheda-Wiedenbrück, Fed. Rep. of Germany

[21] Appl. No.: 867,718

[22] Filed: Jan. 9, 1978

[30] Foreign Application Priority Data

Jan. 13, 1977 [DE] Fed. Rep. of Germany ....... 7700804

[51] Int. Cl.² ............................................. B62P 3/32
[52] U.S. Cl. ................................. 296/26; 296/137 B
[58] Field of Search ............................ 296/26, 137 B; 160/290 R, 284, 399, 403, 383, 384

[56] References Cited

U.S. PATENT DOCUMENTS

| | | | |
|---|---|---|---|
| 3,053,562 | 9/1962 | Farber | 296/137 B |
| 3,061,359 | 10/1962 | Pearlman | 296/137 B X |
| 3,319,996 | 5/1967 | Calthorpe | 296/137 B X |
| 3,524,491 | 8/1970 | Olson | 160/384 X |
| 3,953,066 | 4/1976 | Hamilton | 296/137 B X |

Primary Examiner—Joseph F. Peters, Jr.
Assistant Examiner—Norman L. Stack, Jr.
Attorney, Agent, or Firm—Charles E. Baxley

[57] ABSTRACT

In a vehicle having a fixed roof with a cutout and a lift roof for covering the cutout there is provided apparatus enclosing the space between the lift roof and the cutout which includes a clamping rail fixed along the edge of the roof cutout, a flexible covering having one edge fixed to the peripheral edge of the lift roof, and a clamping part fixed to another edge of the flexible covering, the clamping part being contoured to engage the clamping rail.

2 Claims, 3 Drawing Figures

U.S. Patent Nov. 13, 1979 4,174,133
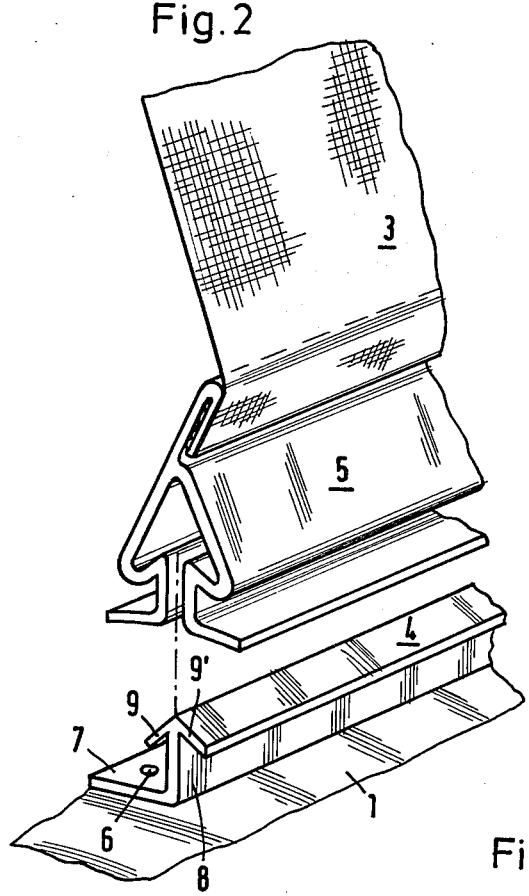
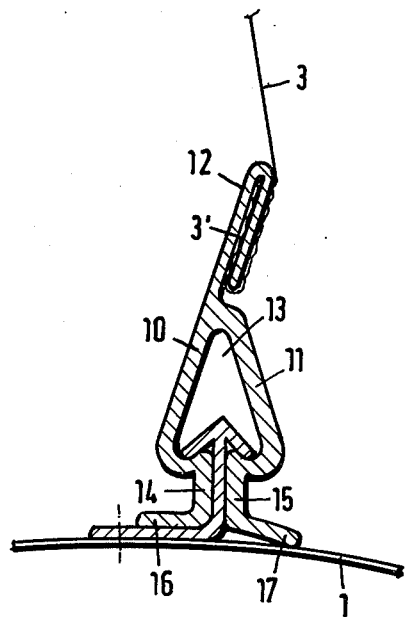
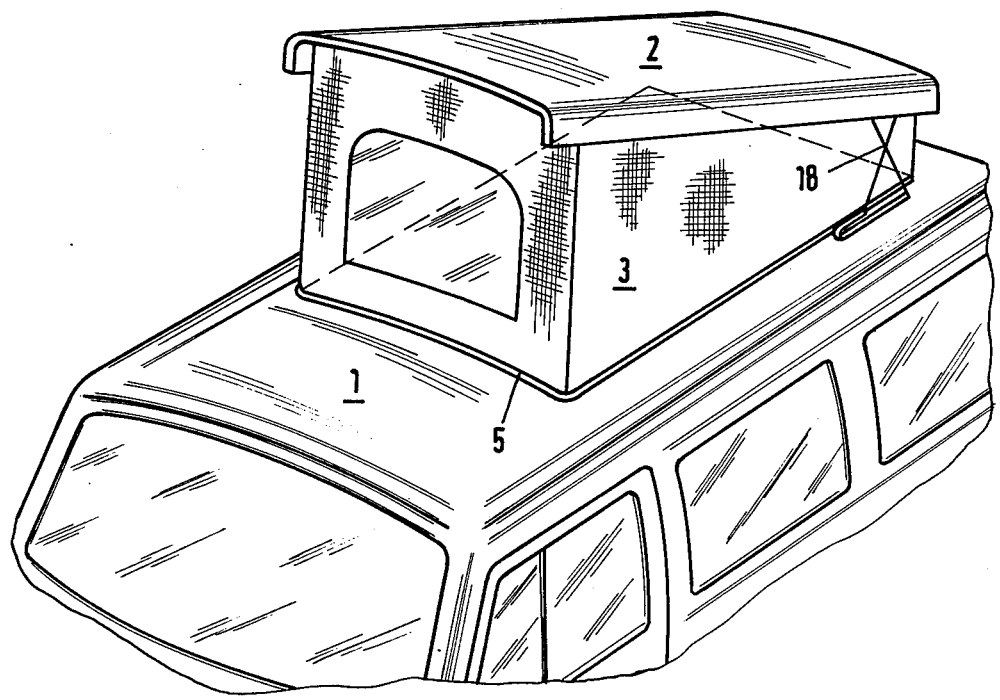

FASTENING DEVICE FOR A FIXABLE COVERING

BACKGROUND OF THE INVENTION

The present invention relates to a device for fastening a flexible covering to a vehicle.

There is frequently the need on vehicles and particularly camping vehicles to fasten flexible coverings to the body of the vehicle, for example, a window, doors, or roof openings in a reliable airtight and watertight manner. This problem occurs with camping vehicles having lift roofs which are raised in a parallel or oblique manner and must be connected to the roof of the vehicle by a flexible covering such as a bellows in order to assure the sealing off of rain water and wind-swept water between the roof of the vehicle and the lift roof. Heretofore such flexible covering has been screwed to the roof of the vehicle by means of holding strips.

SUMMARY OF THE INVENTION

An object of the present invention is to provide a device for fastening a flexible covering, for instance a bellows, which makes it possible to apply the covering in a simple manner, rapidly, and without the use of any special tools.

This object is achieved in accordance with the present invention by a clamping rail which is arranged along one fastening line of the part of the vehicle to be covered and a spring clamping part which is connected with the flexible covering and can be placed on such clamping rail. The clamping rail is preferably developed as an elongated angular member whose one arm serves for fastening to the vehicle part while its free arm is provided with oblique flanges.

In accordance with one particular feature, the clamping part has a connecting part which is folded into a narrow U shape for the fastening of the flexible covering and has two substantially symmetrically developed spring clamping arms which are connected to the one arm of the U-shaped connecting part and form a hollow space to receive the oblique flanges and have adjacent thereto a short parallel adjoining section which terminates in resting surfaces which are outwardly bent.

In accordance with another feature, the clamping rail and the clamping part consist of plastic.

In accordance with still another feature, the clamping rail consists of metal. The clamping rail preferably consists of a light metal.

The flexible covering, after it has been introduced into the connecting part which is folded into a narrow U-shape is connected with said part by sewing and/or gluing.

It is advantageous to fasten the clamping rail to the edge of a roof cutout of the vehicle and to fasten the clamping profile to the flexible covering arranged between the roof of the vehicle and a lift roof which can be pushed up thereon.

BRIEF DESCRIPTION OF THE DRAWING

Other objects, features and advantages of the invention will be apparent from the following detailed description when read with reference to the drawing which shows by way of example and not limitation the presently preferred embodiment of the invention. In the drawing:

FIG. 1 is a partial view of a camping vehicle with lift roof;

FIG. 2 is a perspective view of the device in accordance with the invention, the clamping rail and the clamping part being separate from each other; and FIG. 3 is a section through the clamping rail and clamping part when connected with each other.

DESCRIPTION OF THE PREFERRED EMBODIMENT

In order that a camping van may, on the one hand, have the desired inside height when parked and, on the other hand, avoid the disadvantages of a high vehicle while traveling, it is advantageous to provide the roof 1 of the vehicle (FIG. 1) with a raisable lift roof (2). The lift roof 2 in order to provide protection against wind and rain must be connected with the roof 1 of the vehicle by a flexible covering 3, for instance a bellows. For the connecting of this flexible covering 3 to the lift roof 2 and to the vehicle roof 1, a clamping rail 4 (FIG. 2) and a clamping part 5 (FIG. 2) are provided, the clamping rail 4 being fastened to the roof 1 of the vehicle and the lift roof 2 by rivets 6 or screws, and the clamping part 5 being fastened to the flexible covering by stitching or gluing.

The clamping rail 4 comprises, essentially, an angle iron whose one arm 7 is connected with the roof 1 of the vehicle by rivets 6, screws, or welding and whose other arm 8 terminates in two short symmetrically arranged oblique flanges 9 and 9'. The clamping rail 4 may be made of metal, preferably light metal, for example aluminum, or else of plastic.

For connection with the clamping rail 4 there is provided a clamping part 5 which has in cross section a shape similar to that of the Greek letter omega and has two spring clamping arms 10 and 11 (FIG. 3) as well as with a connecting part 12 which is folded into a narrow U-shape. The two spring clamping arms 10 and 11 form a hollow space 13. Adjoining the space each of the arms has a short parallel section 14 and 15. The sections abut each other and terminate in resting surfaces 16 and 17 which are bent outwardly at approximately a right angle.

The function of the clamping arms 10 and 11 is continued into the aforementioned connecting part 12 which has a narrow U-shape to form a narrow slot for receiving the edge 3' of the flexible covering 3. The edge 3' of the covering 3 which is pushed into the slot of the connecting part 12 is sewed or glued to the connecting part 12.

In the raised position of the lift roof 2, the web of flexible covering 3 rests from the outside against the connecting part 12 and covers the seams of the connecting part 12 by means of the edge 3' of the covering and thereby provides a clean appearance of the connection between the flexible covering and the clamping part 5.

The spring clamping arms 10 and 11 with their hollow space 13 make it possible to engage the clamping part 5 on the clamping rail 4 with the two flanges 9 and 9' catching slight undercuts in the hollow space 13 so as to prevent a loosening of the connection between the clamping part 5 and the clamping rail 4. In this locked position, the outwardly bent resting surfaces 16 and 17 abut against the arm 7 of the clamping rail 4 fastened to the vehicle roof 1 and against the vehicle roof 1 respectively.

For the final mounting on the camping vehicle, the premounted lift roof 2 with the flexible covering and the clamping part 5 fastened to the edge of the covering 3 is fastened to the lifting rods 18 (FIG. 1) and the clamping part 5 is secured by moderate pressure on the clamping rail 4 which is then mounted on the vehicle roof.

One particular advantage of the invention is that the mounting of the lift roof can be effected in a simple and rapid manner as a prefabricated component part without the use of special tools, as a result of which damage to the body paint can be substantially avoided.

While only one embodiment of the invention is shown and described in detail there will now be obvious to those skilled in the art many modifications and variations satisfying many or all of the objects of the invention without departing from the spirit thereof as defined by the appended claims.

I claim:

1. A vehicle comprising a fixed roof for the vehicle, the roof having a cutout, a lift roof for covering the cutout, a clamping rail fixed along the edge of the roof cutout, the clamping rail being an elongated member having one arm for attachment to the fixed roof of the vehicle and another arm having symmetrically placed oblique flanges protruding upwardly from the fixed roof, a flexible covering having one edge fixed to the lift roof, and a clamping part fixed to another edge of the flexible covering, the clamping part being an elongated member generally matching the clamping rail in the direction in which the clamping rail is fixed along the edge of the roof cutout, the clamping part having a connecting part folded into a narrow U shape which engages another edge of the flexible covering along the length thereof to fix the edge of the flexible covering to the clamping part, the clamping part also having two symmetrically developed spring clamping arms extending outwardly from the connecting part for forming a hollow space therebetween and then inwardly to form undercuts in the hollow space for engaging the upwardly protruding symmetrical oblique flanges of the clamping rail in order to establish a connection between the flexible covering and the fixed roof of the vehicle.

2. A vehicle according to claim 1 wherein said clamping part further comprises a pair of parallel sections each protruding from a respective one of the undercuts toward the fixed roof of the vehicle, the sections each terminating in respective resting surfaces which are bent outwardly from each other at approximately right angles, one of the resting surfaces bearing against the arm of the clamping rail that is attached to the fixed roof of the vehicle and the other resting surface bearing directly against the fixed vehicle roof.

* * * * *